(12) United States Patent
Gleason (10) Patent No.: US 7,988,029 B2
(45) Date of Patent: Aug. 2, 2011

(54) EXTERNAL DEBURRING OF WELDED PIPE

(75) Inventor: Patrick Joseph Gleason, Attica, MI (US)

(73) Assignee: Lumco Manufacturing Company, Lum, MI (US)

( * ) Notice: Subject to any disclaimer, the term of this patent is extended or adjusted under 35 U.S.C. 154(b) by 116 days.

(21) Appl. No.: 12/332,801

(22) Filed: Dec. 11, 2008

(65) Prior Publication Data

US 2010/0147927 A1 Jun. 17, 2010

(51) Int. Cl.
*B23K 31/00* (2006.01)
*B23D 1/00* (2006.01)

(52) U.S. Cl. ............................ 228/13; 228/125; 409/299

(58) Field of Classification Search .................. 228/125, 228/19, 13, 159; 409/345, 246, 293, 295, 409/297, 298, 299, 296, 346
See application file for complete search history.

(56) References Cited

U.S. PATENT DOCUMENTS

| | | | |
|---|---|---|---|
| 2,778,281 A * | 1/1957 | Allardt | 409/299 |
| 2,893,292 A | 7/1959 | Naperola | |
| 3,395,614 A | 8/1968 | Dodson | |
| 3,911,710 A | 10/1975 | Gest | |
| RE28,896 E | 7/1976 | Gleason | |
| 4,138,925 A | 2/1979 | Schulte | |
| 4,358,231 A | 11/1982 | Meier | |
| 4,622,729 A | 11/1986 | Dempsey et al. | |
| 4,710,078 A | 12/1987 | Altmeyer et al. | |
| 4,752,994 A | 6/1988 | Brunken et al. | |
| 5,056,972 A | 10/1991 | Burwell et al. | |
| 5,192,013 A | 3/1993 | Abbey, III et al. | |
| 5,323,949 A * | 6/1994 | Ruple et al. | 228/125 |
| 5,368,218 A | 11/1994 | Omura | |
| 5,968,380 A | 10/1999 | Hayashi et al. | |
| 6,158,646 A * | 12/2000 | Calvo et al. | 228/125 |
| 6,887,020 B2 | 5/2005 | Winkels et al. | |
| 7,677,846 B2 * | 3/2010 | VanderPol et al. | 409/132 |
| 7,695,224 B2 * | 4/2010 | Gleason | 409/299 |
| 2007/0023480 A1 | 2/2007 | Chezzi et al. | |

FOREIGN PATENT DOCUMENTS

| | | |
|---|---|---|
| DE | 4218363 | 12/1993 |
| EP | 1238736 | 9/2002 |
| JP | 62277213 | 12/1987 |

* cited by examiner

*Primary Examiner* — Roy King
*Assistant Examiner* — Michael Aboagye
(74) *Attorney, Agent, or Firm* — Reising Ethington P.C.

(57) ABSTRACT

An external weld bead is removed and processed from a welded pipe traveling in a downstream direction. The weld bead is separated from the pipe, allowed to flow in a downstream direction, and is guided downstream and cut into chips at a location downstream of where the weld bead is separated from the pipe.

22 Claims, 5 Drawing Sheets

EXTERNAL DEBURRING OF WELDED PIPE

TECHNICAL FIELD

The present disclosure relates generally to material removal processes such as planing, and more particularly to deburring a weld bead from an external surface of a pipe.

BACKGROUND

Various types of pipe are manufactured according to many different processes. For example, oil field pipe of three to four feet in diameter and 80 to 100 feet in length is frequently welded from sheet stock in a longitudinally continuous manner according to several simultaneous steps. The welding results in a weld bead along an external surface of the welded pipe that is removed to provide a smoother outer surface of the pipe.

A planing tool is placed in the path of travel of and in contact with the external surface of the moving welded pipe to remove the weld bead from the pipe in a continuous fashion, thereby generating a hot, sharp, and stringy separated bead. In older pipe manufacturing equipment, these stringy beads were initially manually attached to a spool, and then automatically wound to the spool during the welding and bead cutting process. But the process had to be interrupted periodically to change spools. In more recent pipe manufacturing processes, the stringy beads are redirected against the direction of travel of the welded pipe at an acute angle with respect to the weld bead on the pipe and fed into a separate material handling device opposite the planing tool and then chopped up by a rotary chopper.

SUMMARY

An apparatus to remove and process an external weld bead from a welded pipe traveling in a downstream direction according to one exemplary implementation includes a planing tool to separate the weld bead from the pipe. The planing tool includes a cutting edge and a guide feature downstream of the cutting edge to direct the weld bead downstream over the planing tool. The apparatus also includes a reciprocating chopper located downstream of the planing tool to cut the weld bead into chips, and a body supporting the planing tool and the chopper and including a passage disposed between the planing tool and the chopper to guide the weld bead downstream through the body from the planing tool to the chopper.

Another exemplary implementation of an apparatus to remove and process an external weld bead from a welded pipe traveling in a downstream direction includes a first cutting device to separate the weld bead from the pipe. The apparatus also includes a second cutting device located downstream of the first cutting device to cut the weld bead into chips, and a guide disposed between the first and second cutting devices to guide the weld bead downstream from the first cutting device to the second cutting device.

An exemplary implementation of a method of removing and processing an external weld bead from a welded pipe traveling in a downstream direction includes separating the weld bead from the pipe and allowing the weld bead to flow downstream. The method also includes guiding the weld bead downstream, and cutting the weld bead into chips at a location downstream of where the weld bead is separated from the pipe.

An exemplary implementation of a weld bead cutting tool includes a cutting edge at an upstream end of the tool, and a guide feature disposed downstream of the cutting edge and extending toward a downstream end of the tool, wherein the guide feature widens from the upstream end toward the downstream end.

At least some of the objects, features and advantages that may be achieved by at least certain embodiments of this disclosure include providing a welded pipe deburring method and related tooling that enables feeding a removed weld bead in a downstream direction to be cut into pieces, wherein the tooling is of relatively simple design, economical manufacture and assembly, rugged, durable, reliable, and in service has a long useful life.

Of course, other objects, features and advantages will be apparent in view of this disclosure to those skilled in the art. Various other methods and tooling embodying the invention may achieve more or less than the noted objects, features or advantages.

BRIEF DESCRIPTION OF THE DRAWINGS

These and other objects, features and advantages of the disclosure will be apparent from the following detailed description of exemplary embodiments and best mode, appended claims, and accompanying drawings in which:

DETAILED DESCRIPTION OF EXEMPLARY EMBODIMENTS

Figure 1:
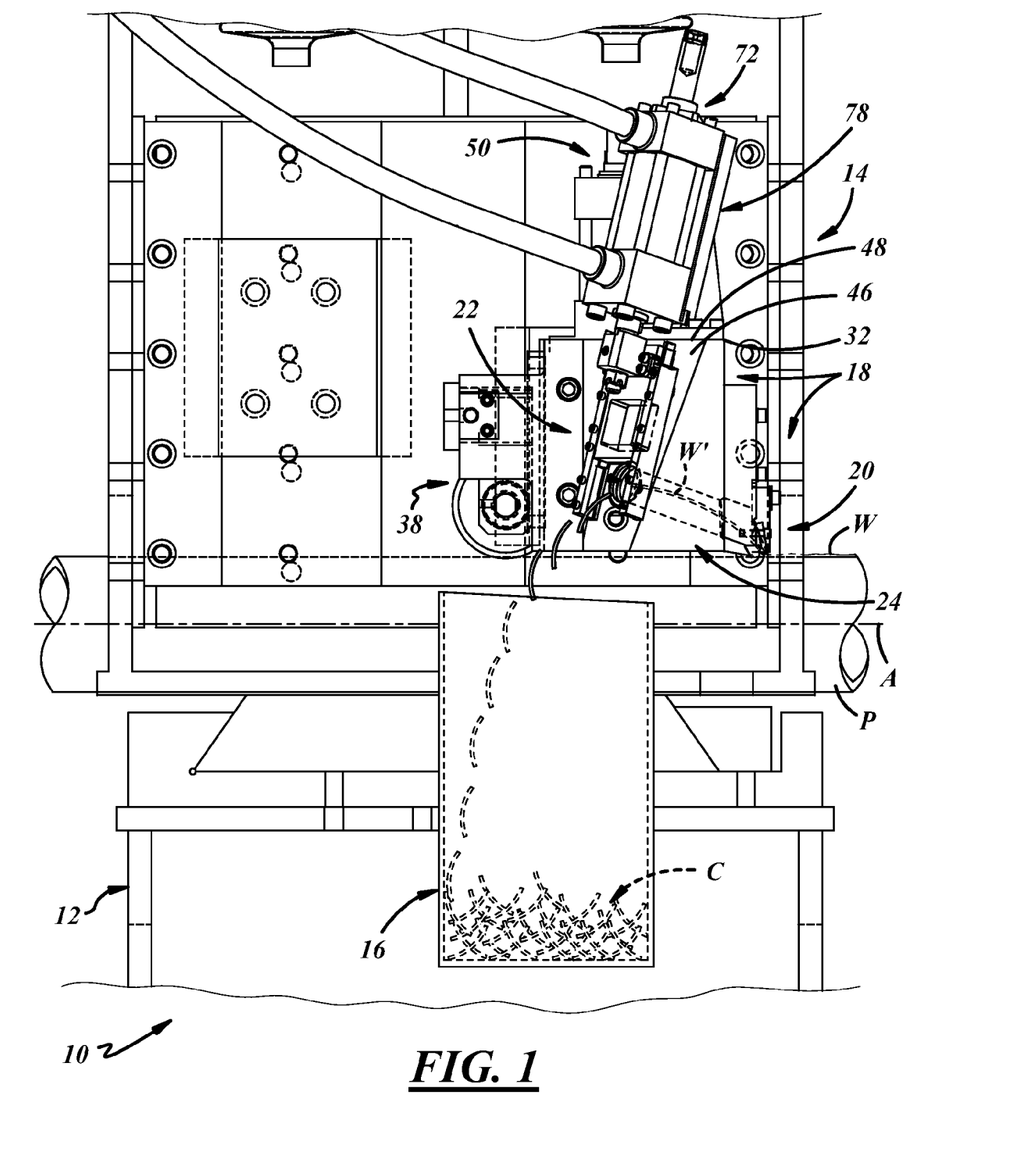
FIG. 1 is a fragmentary elevational view of an exemplary embodiment of weld bead deburring equipment including weld bead deburring tooling.
Figure 2:
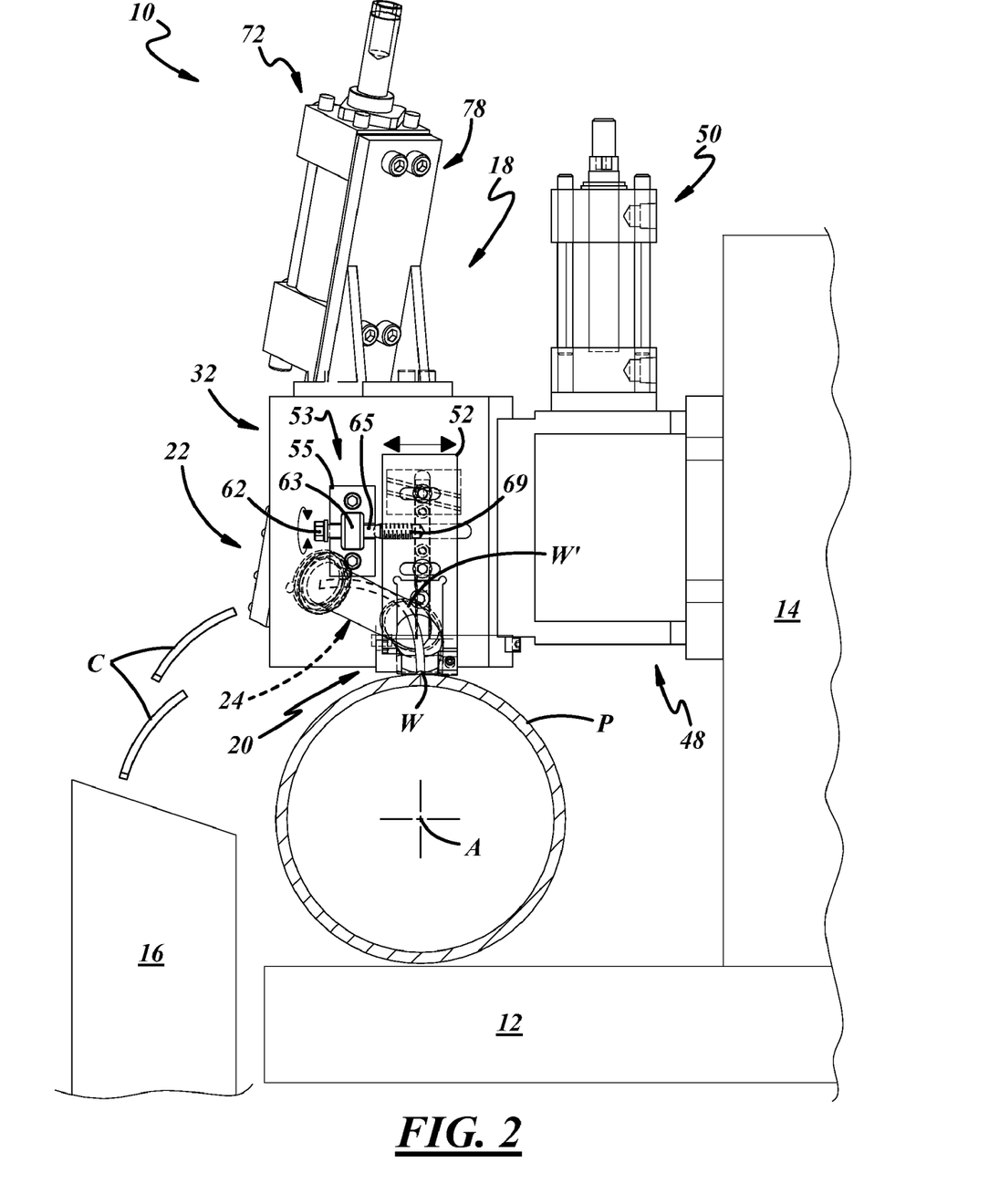
FIG. 2 is an orthogonal, downstream directional view of the weld bead deburring equipment of FIG. 1.

Referring in more detail to the drawings, FIGS. 1 and 2 illustrate a material removal operation including weld bead deburring equipment 10 to remove a weld bead W from an exterior of a pipe P traveling in a downstream direction. The pipe P may be manufactured in any suitable manner by another operation (not shown) upstream of the deburring equipment 10. For example, the pipe P may be constructed from a strip of metal or skelp that may be unrolled from a coil of sheet metal and curled into a cylindrical shape by bringing laterally opposed edges of the skelp together to form a seam, which gets welded, thereby leaving the radially outwardly extending weld bead W. As used herein, the terminology weld bead includes that portion of a seam weld of a pipe, which is to be removed from the welded pipe.

Regardless of how the pipe P is manufactured, the weld bead W may be removed by the deburring equipment 10 as the pipe P is fed downstream with respect to the equipment 10. Like the pipe P, the removed weld bead W' also flows in a generally downstream direction. The deburring equipment 10 may include a machine base 12, a machine frame 14 coupled to the machine base 12 in any appropriate manner, a receptacle 16 to receive pieces or chips C of the weld bead W', and deburring tooling 18 that may be coupled to the machine frame 14 in any suitable manner to remove and process the external weld bead W from the welded pipe P. Machine bases and frames are well known, and the frame 14 may be stationary or movable relative to the base 12, for example, along a slide (not shown). The receptacle 16 may be freestanding or coupled to the base 12, and may include a chute, hopper, gondola, or any other appropriate type of receptacle, and may be offset to one side of the pipe P.

In general, the deburring tooling 18 may include a first cutting device 20 to cut the weld bead W and separate it from the pipe P to produce the cut and separated weld bead W', a second cutting device 22 located downstream of the first cutting device 20 to cut the separated weld bead W' into the chips C, and a guide 24 disposed between the first and second cutting devices 20, 22 to guide the separated weld bead W' downstream from the first cutting device 20 to the second cutting device 22. The guide 24 may include any suitable device(s) to guide the weld bead W' in a downstream direction. For example, the guide 24 may include one or more rails, chutes, channels, plates, or the like (not shown).

Figure 3:
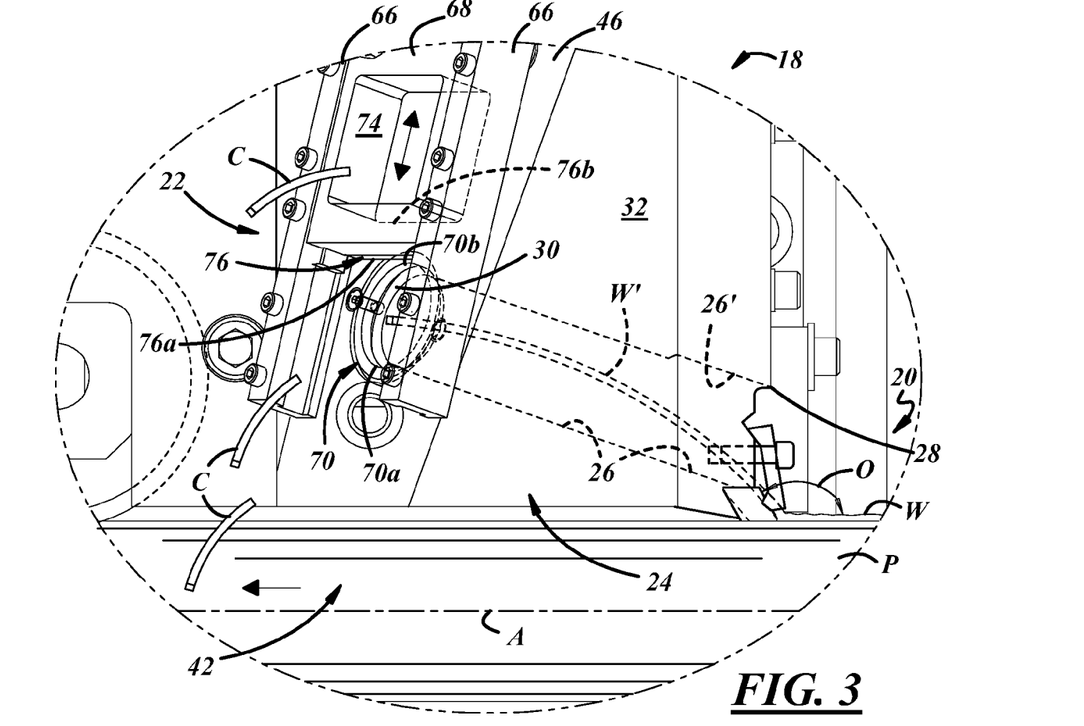
FIG. 3 is an enlarged fragmentary perspective view of a portion of the weld bead deburring tooling of FIG. 1.

In another example, and referring to FIG. 3 of the illustrated exemplary embodiment, the guide 24 may be at least partially defined by a passage 26 including an upstream inlet 28 to receive the weld bead W, and a downstream outlet 30 to discharge the weld bead W' or chips C of the weld bead W'. The passage 26 may be straight, angled, curved or the like, and may be at least partially defined by a body 32, which may support the first and second cutting devices 20, 22 in any appropriate manner.

As shown in FIG. 2, the body 32 may be carried by the machine base 12 or frame 14 in any suitable manner. For example, the body 32 may be coupled to any appropriate portion of the frame 14, for example, via a second body 48 and a tooling actuator 50 to move the deburring tooling 18 vertically with respect to the pipe P. The second body 48 may be coupled to the body 32 via, for example, guide rails (not shown) or the like that allow the body 32 to float and thereby accommodate manufacturing variations in the pipe P being processed. The tooling actuator 50 may be coupled to an overhead portion (not shown) of the frame 14 in any suitable manner and may be actuated to lift the second body 48, which by virtue of stops, catches, or the like disposed between the bodies 32, 48, carries the body 32 to lift the body 32 out of its work position. The tooling actuator 50 may include a cylinder, for example, a pneumatic or hydraulic cylinder that may be supplied with pressurized fluid and controlled in any suitable manner. The actuator 50 may instead include an electromechanical device, for example, a solenoid, a motor, or the like that may be supplied with electrical power and control signals and controlled in any appropriate manner.

Figures 4, 5, 8:
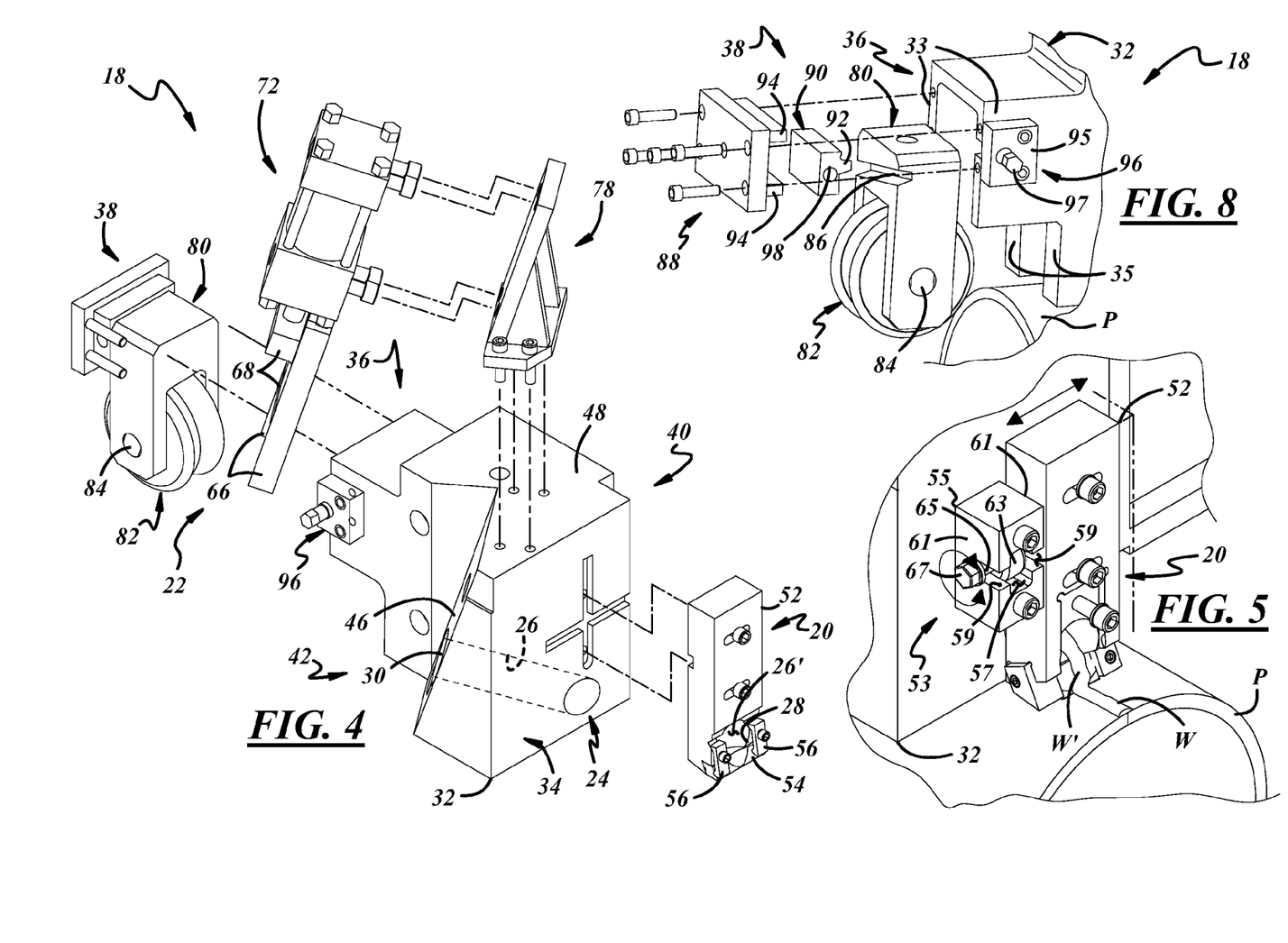
FIG. 4 is an exploded perspective view of a portion of the weld bead deburring tooling of FIG. 1.
FIG. 5 is an enlarged fragmentary perspective view of a portion of the weld bead deburring tooling of FIG. 1.
FIG. 8 is an exploded perspective view of a portion of the weld bead deburring tooling of FIG. 1.

Referring to FIG. 4, the body 32 generally may include an upstream end 34 that may support the first cutting device 20, a downstream end 36 that may support a depth setting device 38 to set a depth of cut of the first cutting device 20, an inboard side 40, and an outboard side 42 that may include an angled surface 46, and a top 48. The outboard side 42 and the top 48 may be used to support the second cutting device 22.

The first cutting device 20 may include a tool holder 52, a cutter 54, and clamps 56 to retain the cutter 54 to the tool holder 52 in any suitable manner such as fastening via cap screws or the like. The tool holder 52 may support the cutter 54 and may include a passage 26' that may align with the passage 26 in the body 32 to further define the guide 24 and receive the weld bead W' as it flows downstream through the guide 24.

The holder 52 may be adjustably coupled to the upstream end 34 of the body 32. For example, cap screws or other fasteners may extend through slots in the holder 52 and may be fastened to the body 32 to allow the holder 52 to be adjusted side to side across the path of travel of the pipe P.

More specifically, and referring to FIGS. 2 and 5, an adjustment apparatus 53 may be carried by the body 32 for relatively fine adjustment of the holder 52. The adjustment apparatus 53 may include a block 55 coupled to the body 32 in any appropriate manner, for example, by fasteners. The block 55 may include an opening 57 and passages 59 in side walls 61 partially defining the opening 57. The adjustment apparatus 53 may also include an adjustment wheel 63 disposed in the opening 57, and an adjustment shaft 65 extending through the adjustment wheel 63 and disposed across the block 55 through the passages 59. The adjustment shaft 65 and adjustment wheel 63 are rotatably supported on the body 32 by the block 55. The adjustment shaft 65 includes a head 67 at one end opposite the tool holder 52, and a threaded end 69 (FIG. 2) coupled to a corresponding threaded portion of the tool holder 52. The adjustment shaft 65 also has a threaded middle portion for threading engagement to the adjustment wheel 63, which has a corresponding threaded passage. To adjust the holder 52, the fasteners coupling the holder 52 to the body 32 are loosened, the adjustment wheel 63 is rotated relative to the shaft 65 to advance or retract the adjustment shaft 65, thereby pushing or pulling the holder 52 to a desired position, and then the fasteners are tightened to lock the holder 52 in place.

Figure 6:
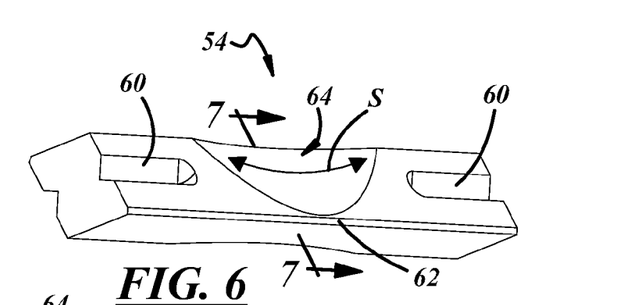
FIG. 6 is an enlarged perspective view of a cutter of the tooling of FIG. 1.
Figure 7:
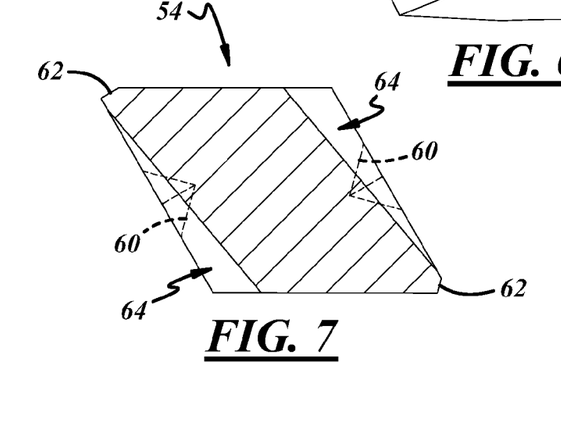
FIG. 7 is a cross-sectional view of the cutter shown in FIG. 6, taken along line 7-7 of FIG. 6.

Referring to FIGS. 6 and 7, the cutter 54 may be a planing tool or any other suitable type of cutting tool or device appropriate to cut metal and may be composed of carbide or any other appropriate tool material. The cutter 54 may be generally of parallelogram shape in side profile. Also, the cutter 54 may include recesses 60 at opposite outboard sides for positive interlocking with the clamps 56 (FIG. 4), a cutting edge 62 at an upstream end, and a guide feature 64 disposed downstream of the cutting edge 62 and extending toward a downstream end of the cutter 54 to guide the weld bead W' over the cutter 54. The guide feature 64 may be of generally parabolic shape as shown in FIG. 7, or may be of any other suitable shape, for example, that widens from the upstream end toward the downstream end. Also, the guide feature 64 may be curved from side-to-side in a generally transverse direction across the cutter 54 as exemplified by arrow S. As shown in FIG. 7, the guide feature 64 may be generally straight from end-to-end in a longitudinal direction extending from the upstream end cutting edge 62 to the downstream end of the cutter 54. As is also evident from FIG. 7, the cutter 54 may be reversible to provide an indexable or multiple-use tool. The cutter 54 may be composed of any material appropriate for removing a weld bead from a pipe, for example, carbide, tool steel, or the like.

Referring to FIGS. 3 and 4, the second cutting device 22 may include a reciprocating chopper as shown, or a rotary chopper, or any other suitable cutting device. The second cutting device 22 may include guides 66, a guillotine or movable cutter 68 carried by the guides 66 for reciprocating movement, an anvil or stationary cutting tool 70 (FIG. 3) carried by and coupled to the body 32 at the outlet 30 of the body passage 26, and an actuator 72 (FIG. 4) to reciprocate the movable cutter 68.

Referring to FIG. 3, the guides 66 may be coupled to the outboard side 42 of the body 32 in any appropriate manner and, more specifically, to the angled surface 46. The guides 66 may include any suitable linear guide members, with or without bearings.

The movable cutter 68 may be slidably carried by the guides 66 along the angled surface 46 and may include an aperture 74 through which chips C may pass as they are chopped from the weld bead W'. The cutter 68 may also include a cutting blade 76 that may be integral with the cutter 68 or may be a separate cutting tool carried by the cutter 68 in any appropriate fashion. The cutting blade 76 may include a lower cutting edge 76a and an upper cutting edge 76b.

The cutting tool 70 may be a ring as shown, or any other suitable replaceable tool member. The cutting tool 70 may have a lower cutting edge 70a and an upper cutting edge 70b. The cutting tool 70 may be coupled to the body 32 by press fit, fastening by one or more separate fasteners, integral threading between the tool 70 and the body 32, or in any other appropriate manner.

Referring to FIG. 4, the actuator 72 may include a cylinder, for example, a pneumatic or hydraulic cylinder that may be supplied with pressurized fluid in any suitable manner. The actuator 72 may instead include an electromechanical device, for example, a solenoid, a motor, or the like. In any case, the actuator 72 is coupled to the cutter 68 via the illustrated component coupling connection or in any other appropriate fashion, for example, by fastening, welding, clipping, and/or the like. The actuator 72 may be supported by an adapter 78 that may be angled consistent with the angled surface 46 of the body 32, and coupled between the top 48 of the body 32 and the side of the actuator 72 in any suitable manner, for example, by fastening, welding, or the like. Accordingly, the adapter 78 may be defined as an extension of the body 32.

Referring to FIG. 8, the deburring tooling 18 may also include the depth setting device 38 coupled to the downstream end 36 of the body 32. The depth setting device 38 may include a yoke 80 that may be adjustably coupled to the body 32 in any appropriate manner as explained below, and a guide roller 82 that may be rotatably carried by the yoke 80, for example, by a shaft 84 in any suitable manner. The yoke 80 is carried between flanges 33 of the body 32 at the downstream end 36 and includes an angled groove 86 at a downstream end of the yoke 80. The yoke 80 is adjustably carried between the flanges 33 and between a downstream facing wall 35 of the body 32 and a retainer 88 that is coupled to the body 32. The device 38 also includes an adjustment adapter 90 having an angled tongue 92 to cooperate with the angled groove 86 of the yoke 80. The retainer 88 includes upper and lower guides 94 between which the adapter 90 is slidably disposed. The retainer 88 is coupled to the flanges 33 of the body 32 to trap the yoke 80 and the adapter 90 in an adjustable manner to the body 32.

The yoke 80 may be adjusted by an adjuster 96 coupled to the body 32. For example, the adjuster 96 may include a plate 95 coupled to one of the flanges 33 in any appropriate manner, and a set screw 97 threaded through the plate 95 and configured to extend through the respective flange 33 and to thread into a corresponding threaded passage 98 of the adapter 90. Rotation of the set screw 97 causes generally side-to-side translation of the adapter 90, which in turn causes generally vertical translation of the yoke 80 and roller 82. Accordingly, the device 38 is adjustable so as to control a depth of cut of the cutter 54 into the weld bead W.

In operation, and referring to FIG. 3, the weld bead W is separated from the pipe P, for example, by the cutter 54 as the pipe P flows downstream. As the pipe P continues to flow downstream past the cutter 54, the separated weld bead W' is also allowed to flow downstream at an obtuse angle O over the cutter 54 and into the guide 24. The guide feature 64 (FIG. 6) of the cutter 54 may assist with directing the separated weld bead W' into the guide 24.

The weld bead W' is guided downstream, for example, through the passage 26, and is cut into the chips C in a location downstream of the location at which the weld bead W is separated from the pipe P, for example, at the cutter 54. More specifically, the weld bead W' may be chopped into pieces when the weld bead W' is sheared between the lower cutting edge 76a of the cutter 68 and the lower cutting edge 70a of the cutting tool 70, and/or when the weld bead W' is sheared between upper cutting edge 76b of the cutter 68 and the upper cutting edge 70b of the cutting tool 70. In other words, the cutting tool 70 of the cutter 68 may shear the weld bead W' during a downstroke of the cutter 68 wherein chips C fall beneath the cutter 68 into the receptacle 16, and during an upstroke of the cutter 68 wherein chips C pass through the aperture 74 of the cutter 68 and fall into the receptacle 16.

The chips C may be discharged to a side of the pipe P as shown in FIG. 2. For example, the outlet 30 of the passage 26 may be laterally or radially offset with respect to the inlet 28 and/or the weld bead W. Accordingly, even though the weld bead W' enters the passage 26 substantially corresponding to a central axis A of the pipe P, the configuration of the passage 26 permits the chips C to exit the passage 26 at a location sufficiently offset from the central axis C of the pipe P so that the chips C may fall away from the pipe P and into the receptacle 16. In other words, the weld bead W' enters the passage 26 generally parallel to the longitudinal axis C and exits the passage 26 laterally and radially offset from the entrance.

Figure 9:
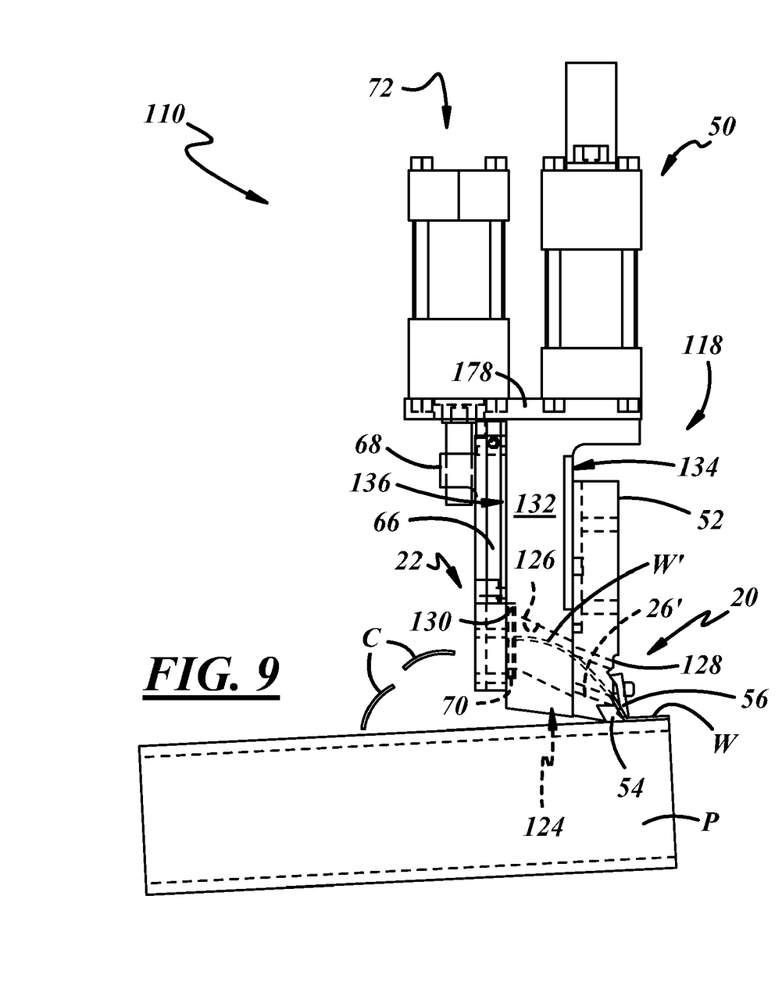
FIG. 9 is an elevational view of weld bead deburring tooling of another exemplary embodiment of weld bead deburring equipment.
Figure 10:
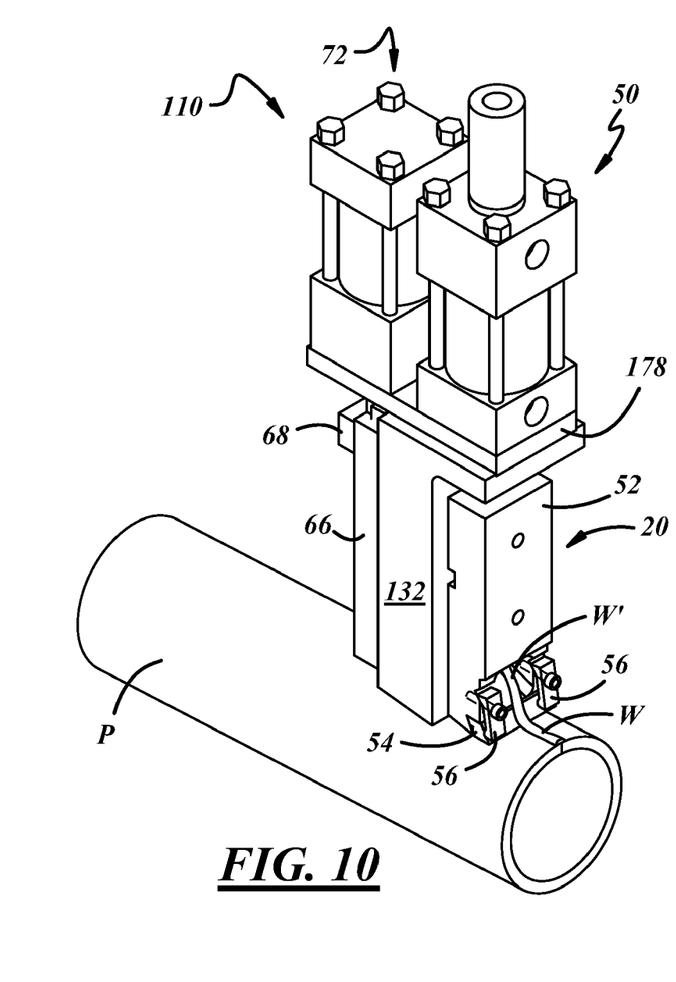
FIG. 10 is a perspective view of the tooling of FIG. 9.

FIGS. 9 and 10 illustrate another exemplary embodiment of weld bead removal or deburring equipment 110 to remove or deburr a weld bead W from a pipe P traveling in a downstream direction. This embodiment is similar in many respects to the embodiment of FIGS. 1 through 8 and like numerals between the embodiments generally designate like or corresponding elements throughout the several views of the drawing figures. Additionally, the descriptions of the embodiments are incorporated by reference into one another and the common subject matter generally may not be repeated here.

The deburring equipment 110 includes deburring tooling 118 that may be coupled to the machine base 12 or frame 14 shown in FIG. 1 in any suitable manner to remove and process the external weld bead W from the welded pipe P. In general, the deburring tooling 118 may include the first cutting device 20 to cut or separate the weld bead W from the pipe P, the second cutting 22 device located downstream of the first cutting device 20 to cut the separated weld bead W' into the chips C, and a guide 124 disposed between the first and second cutting devices 20, 22 to guide the weld bead W' downstream from the first cutting device 20 to the second cutting device 22.

The guide 124 may be at least partially defined by a body 132, which may support the first and second cutting devices 20, 22 in any appropriate manner. The body 132 generally may include an upstream end 134 that may support the first cutting device 20, and a downstream end 136 that may be used to support the second cutting device 22. The body 132 may be coupled to the frame 14 (not shown) by the tooling actuator 50 to move the rest of the deburring tooling 118 vertically with respect to the pipe P. The guide 124 may be at least partially defined by a passage 126 including an upstream inlet 128 to receive the weld bead W', and a downstream outlet 130 to discharge the weld bead W' or chips C of the weld bead W'.

The first cutting device 20 may be similar to or identical to that of the first embodiment and, thus, may include the tool holder 52 coupled to the upstream end 134 of the body 132 in any suitable manner, the cutter 54, and the clamps 56 to retain the cutter 54 to the tool holder 52. Accordingly, the tool holder 52 may include the passage 26' that may align with the passage 126 of the body 132 to further define the guide 124 and receive the weld bead W' as it flows downstream through the passage 126.

The second cutting device 22 may be similar to or identical to that of the first embodiment except that the device 22 is supported at the downstream end 136 of the body 132. The device 22 includes the reciprocating chopper having the guides 66, the cutter 68 slidably carried by the guides 66 for reciprocating movement, the cutting tool 70 carried by and coupled to the body 132 at the outlet 130 of the passage 126, and the actuator 72 to reciprocate the cutter 68. The actuator 72 may be supported by an adapter plate 178 coupled to the top of the body 132 in any appropriate manner.

In general, the various components of the deburring apparatuses 10, 110 may be composed of any suitable material(s), for example, steel, aluminum, iron, or any other appropriate metals, and may be constructed in any suitable manner, for example, as castings, weldments, machined components, or according to any other appropriate manufacturing methods.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

What is claimed is:

1. An apparatus to remove and process an external weld bead from a welded pipe traveling in a downstream direction, comprising:
    a tool holder carrying a planing tool, which separates the weld bead from the pipe while the pipe travels in the downstream direction;
    a chopper spaced downstream of the planing tool in the downstream direction of travel of the pipe to cut the separated weld bead into chips; and
    a body supporting the planing tool and the chopper and including a passage disposed between the planing tool and the chopper to guide the separated weld bead in the downstream direction of travel of the pipe through the body from the planing tool to the chopper.

2. The apparatus of claim 1 wherein the passage includes an inlet generally corresponding to the separated weld bead and an outlet transversely offset with respect to the inlet to permit the chips to fall away from the pipe.

3. The apparatus of claim 1 wherein the body includes an upstream end to support the tool holder and an outboard side including an angled surface on which the reciprocating chopper is supported.

4. The apparatus of claim 1 wherein the body includes an upstream end to support the tool holder and a downstream end to support the chopper.

5. The apparatus of claim 1 wherein the tool holder includes a tool holder passage corresponding to the passage in the body and through which the separated weld bead flows.

6. The apparatus of claim 1 wherein the body includes an upstream end to support the tool holder, which is adjustably coupled to the upstream end.

7. An apparatus to remove and process an external weld bead from a welded pipe traveling in a downstream direction, comprising:
    a tool holder carrying a planing tool, which separates the weld bead from the pipe;
    a chopper located downstream of the planing tool to cut the separated weld bead into chips; and
    a body supporting the planing tool and the chopper and including a passage disposed between the planing tool and the chopper to guide the separated weld bead downstream through the body from the planing tool to the chopper, wherein the body includes an upstream end to support the tool holder, which is adjustably coupled to the upstream end, and further comprising an adjustment apparatus coupled between the body and the tool holder to adjust the tool holder, and including an adjustment shaft and an adjustment wheel rotatably supported on the body by a block coupled to the body, wherein the adjustment wheel is threadingly engaged on the adjustment shaft, which is coupled at one end to the tool holder.

8. The apparatus of claim 1, wherein the chopper includes guides coupled to the body, a movable cutter carried along the guides, and an actuator supported by the body and coupled to the movable cutter.

9. The apparatus of claim 8 wherein the movable cutter includes an aperture through which the chips may pass.

10. The apparatus of claim 9 wherein the movable cutter includes a cutting blade adjacent the aperture.

11. The apparatus of claim 8 further comprising a cutting tool carried by the body at an outlet of the passage, wherein the separated weld bead is sheared between the movable cutter and the cutting tool.

12. The apparatus of claim 1 wherein the body includes an upstream end to support the tool holder and a downstream end, and the apparatus further comprises a depth setting device coupled to the downstream end of the body.

13. The apparatus of claim 12 wherein the depth setting device includes a yoke adjustably coupled to the body, and a guide roller rotatably coupled to the yoke.

14. The apparatus of claim 13 further comprising an adjuster coupled to the body to adjust the yoke.

15. The apparatus of claim 1 wherein the planing tool includes a cutting edge and a guide feature downstream of the cutting edge to direct the separated weld bead downstream over the planing tool.

16. An apparatus to remove and process an external weld bead from a welded pipe traveling in a downstream direction, comprising:
    a first cutting device to separate the weld bead from the pipe while the pipe travels in a downstream direction;
    a second cutting device spaced downstream of the first cutting device in the direction of travel of the pipe to cut the separated weld bead into chips; and
    a guide disposed between the first and second cutting devices and spaced downstream of the first cutting device in the direction of travel of the pipe to guide the separated weld bead in the downstream direction of travel of the pipe from the first cutting device to the second cutting device.

17. The apparatus of claim 16 wherein the guide is oriented to permit the chips to fall away from the pipe.

18. The apparatus of claim 16 wherein the first cutting device includes a passage corresponding to the guide and through which the separated weld bead flows.

19. The apparatus of claim 16 wherein the second cutting device includes a reciprocating cutter having an aperture through which the chips may pass and a cutting blade adjacent the aperture.

20. The apparatus of claim 19 further comprising a cutting tool at a downstream end of the guide, wherein the separated weld bead is sheared between the cutting blade of the movable cutter and the cutting tool.

21. An apparatus to remove and process an external weld bead from a welded pipe traveling in a downstream direction, comprising:
- a body including a passage therethrough;
- a tool holder supported on the body and carrying a planing tool, which separates the weld bead from the pipe while the pipe travels in the downstream direction; and
- a chopper supported on the body and spaced downstream of the planing tool in the downstream direction of travel of the pipe to cut the separated weld bead into chips;
- wherein the body passage guides the separated weld bead in the downstream direction of travel of the pipe through the body from the planing tool to the chopper.

22. An apparatus to remove and process an external weld bead from a welded pipe traveling in a downstream direction, comprising:
- a guide;
- a first cutting device supported on the guide to separate the weld bead from the pipe while the pipe travels in a downstream direction;
- a second cutting device supported on the guide and spaced downstream of the first cutting device in the direction of travel of the pipe to cut the separated weld bead into chips;
- wherein the guide guides the separated weld bead in the downstream direction of travel of the pipe from the first cutting device to the second cutting device.

* * * * *